G. W. LOVETT.
HAND SLED.
APPLICATION FILED SEPT. 10, 1919.
1,431,826.
Patented Oct. 10, 1922.
2 SHEETS—SHEET 1.
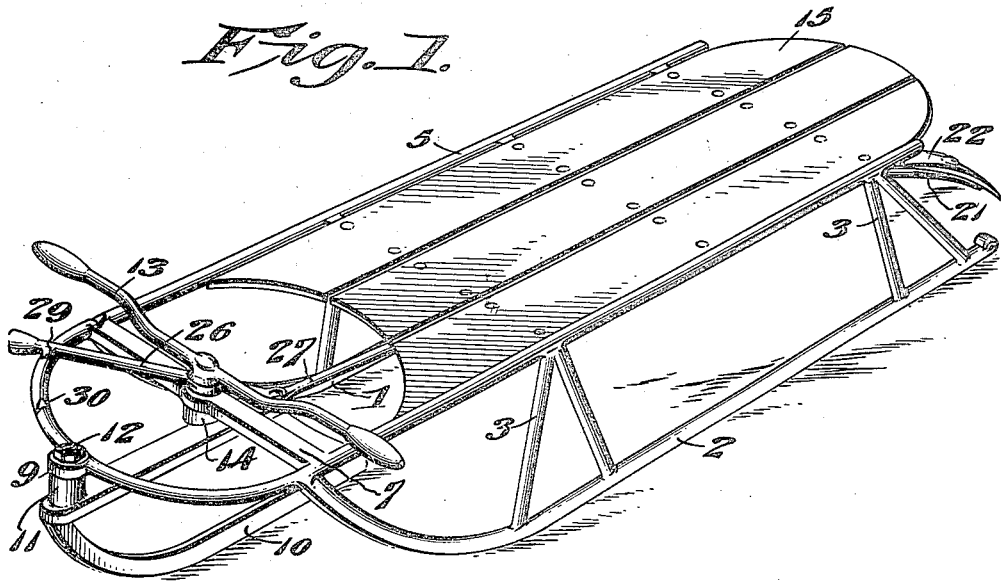
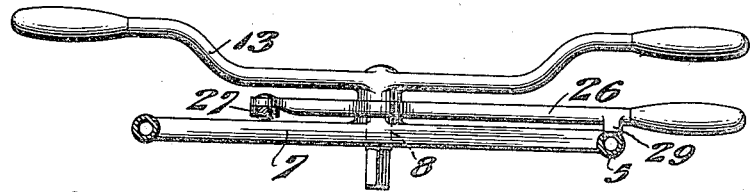
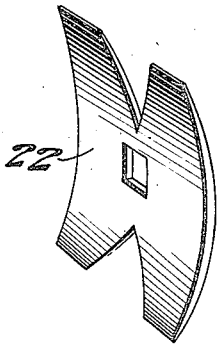
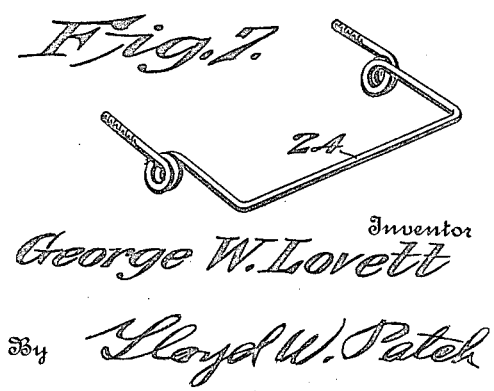
Inventor
George W. Lovett
By Lloyd W. Patch
his Attorney G. W. LOVETT.
HAND SLED.
APPLICATION FILED SEPT. 10, 1919.
1,431,826.
Patented Oct. 10, 1922.
2 SHEETS—SHEET 2.
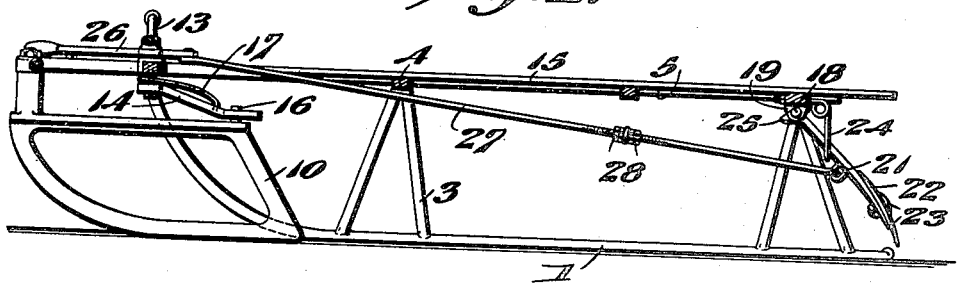
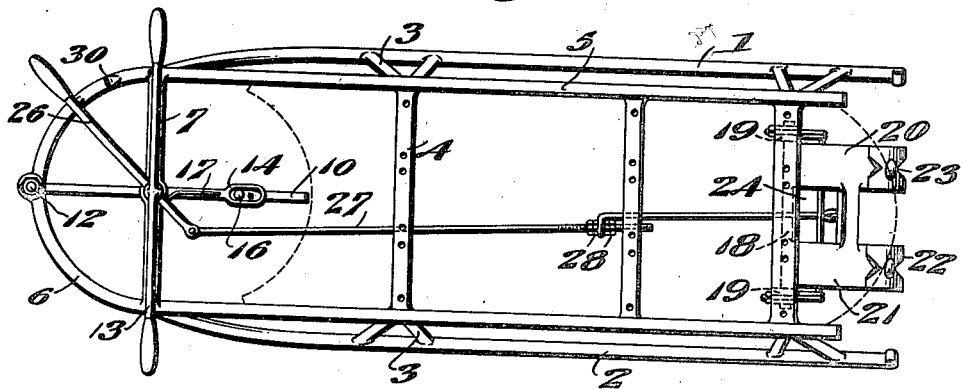
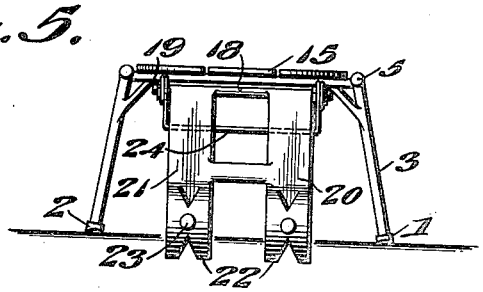
George W. Lovett, Inventor
By Lloyd W. Patch
his Attorney Patented Oct. 10, 1922.

1,431,826

UNITED STATES PATENT OFFICE.

GEORGE W. LOVETT, OF STOCKBRIDGE, MASSACHUSETTS.

HAND SLED.

Application filed September 10, 1919. Serial No. 322,965.

*To all whom it may concern:*

Be it known that I, GEORGE W. LOVETT, a citizen of the United States, residing at Stockbridge in the county of Berkshire and State of Massachusetts, have invented new and useful Improvements in Hand Sleds, of which the following is a specification.

My present invention pertains to hand sleds, and particularly to steering and brake mechanism for sleds adapted for coasting.

An object is to provide a sled structure which possesses a maximum of strength in the runners and associated parts, and which has an auxiliary steering rudder mounted to be manually moved to guide the course of travel of the sled.

A further object resides in associating with the main supporting and the steering structure, a brake mechanism by which movement of the sled is retarded and stopped, and in providing means to retain the brake structure in various settings.

With these and other objects in view, which will be apparent from the specification, drawings, and claims, this invention includes certain novel features of construction and combinations of parts which will now be set forth.

In the drawings:

Figure 1 is a view in perspective showing a sled constructed after the manner of my invention.

Fig. 2 is a longitudinal sectional view through the structure.

Fig. 3 is a plan view with the top board removed.

Fig. 4 is a transverse sectional view to better disclose the arrangement of the operating handles for the steering and brake mechanism.

Fig. 5 is a view in rear elevation showing the brake mounting.

Fig. 6 is a detail perspective of one of the brake shoes.

Fig. 7 is a detail view illustrating the brake releasing spring.

The runners 1 and 2 are preferably grooved, and these runners carry the braces 3, which are in the present instance diagonally disposed. Crossbars 4 are secured at the upper ends of the braces to connect and properly space the runners.

The braces 3 are preferably made of steel tubing welded to the runners and the crossbars are similarly connected. A piece of tubing indicated at 5 is bent in its middle to be U-shaped, and is secured to the crosspieces 4 and to the upturned ends of the runners 1 and 2, by welding, brazing, or otherwise, with the loop 6 thereof disposed beyond the upturned forward ends of the runners, and a supporting bar 7 is secured transversely at the ends of the runners so that the loop presents substantially a semi-circle. A bearing 8 is provided centrally on bar 7, and the loop 6 carries bearing 9 substantially in line therewith.

A steering runner 10 preferably of metal and preferably grooved on its bearing edge, is provided at its forward end with a bearing 11, and a pin 12 is fitted to bearings 9 and 11 to mount runner 10 to swing between runners 1 and 2. A pair of handle-bars 13 is provided with a bearing spindle which is mounted through bearing 8 and has an arm 14 secured on the lower end thereof to project rearwardly beneath the top board 15 of the sled. At its free end this arm has an opening which receives bearing extension 16 carried at the rear of runner 10, and as the handle-bars are swung around their mounting in bearing 8 runner 10 is shifted about its center of mounting on pin 12. This steering runner is made of a width to extend slightly below the bearing faces of runners 1 and 2 and a sufficient contact of the same with the surface over which the sled is traveling is thus at all times assured.

A spring 17 is provided to resiliently hold runner 10 in a centered position between runners 1 and 2, as when the sled is traveling in a straight path. Handle-bars 13 have hand grips thereon, and are preferably bent up at their ends to give clearance where the handle grips are mounted, as disclosed in Fig. 4. By this mounting of runner 10, when the lower edge of the runner wears down this steering edge can be again brought to the proper position by fitting washers or other fillers between bearings 9 and 11 to give the desired adjustment.

A brake-carrying shaft 18 is mounted in bearings 19 secured on the rear crossbar 4, and brake shoe supports 20 and 21 are formed radially adjacent the ends thereof. Brake shoes 22, the form of which is best shown in Fig. 6, are provided with central openings and bolts 23 are fitted through these openings and through registering openings on supports 20 and 21 to secure the brake shoes upon these supports. The brake shoes are preferably curved throughout their length to give a better gripping edge and are constructed with two effective edges so that when one edge of the shoe becomes worn it can be reversed to give greater utility. These effective edges are preferably notched to give a better braking grip. The arrangement of the parts as described is such that when the radially extending supports 20 and 21 are brought to depend vertically downwardly beneath shaft 18 they extend say two inches below the bearing surfaces of runners 1 and 2. A spring 24 is provided to normally swing said supports rearwardly to raise shoes 23 above a contacting position, and a shoulder 25 is provided on the shaft to limit downward or forward swinging movement of the supports.

A brake lever 26 swung on the bearing spindle of handle-bars 13 extends to swing at one end adjacent the loop 6, and at the remaining end has a draw rod 27 connected. This draw rod is connected at its free end to the shoe-carrying supports 20 and 21, and therefore as the brake lever is swung the brake shoes will be moved down against the tension of spring 24 to a braking position. It is preferable that draw rod 27 be made in two parts to allow for adjustment, adjusting nuts 28 being provided on the one portion to engage with a loop on the attached end of the remaining portion.

That end of brake lever 26 swinging adjacent loop 6 is provided with a handle, and has a pin or stop lug 29 projecting downwardly therefrom in line with the loop. Notches 30 are provided in the body structure of the loop at spaced points and the pin or lug 29 engages therein, brake lever 26 being sufficiently resilient that it may be slightly sprung to disengage the pin. By this arrangement the brake structure is locked in the inoperative, in a full set and in intermediate positions, and in any setting both hands of a person riding on the sled are left free for operation of the steering runner.

From the foregoing it will be seen that I have provided a sled, adapted for coasting and the like, which is constructed to have great strength and rigidity, and which embodies steering structure and brake or speed retarding means, the sled being of such construction that the embodiment of the steering and brake means in no way interferes with the use thereof as a hand or coasting sled, and at the same time insures greater safety and a wider range of utility.

While I have described the structure as an entirety, and have mentioned only certain possible modifications, it will be appreciated that my purpose is to provide a hand sled, and steering and brake mechanism for such a sled, in view of which it is to be understood that in practice I do not limit myself to such specific details as herein set forth, but may resort to practical modifications falling within the scope of the invention as defined in the appended claims.

I claim:

1. A hand sled comprising with runner structures, a member looped in its middle portion connected on said runner structures to form side bars and with the loop disposed forwardly, a steering runner pivoted at one end on the forward portion of the loop to be disposed intermediate the runner structures, a cross bar connected between the side bars at the base of the loop, and an operating handle mounted on the cross bar by which the steering runner is shifted.

2. A hand sled comprising with runner structures connected by cross braces, an elongated member looped in its center connected with said cross bars and runner structures to form side bars and with the loop disposed forwardly, a cross bar mounted between said side bars at the base of the loop, a steering runner pivotally connected at one end at the forward side of said loop to be intermediate and extend parallel with the runner structures, and a pair of handle bars movably mounted on said cross bar connected to actuate said steering runner.

3. A hand sled comprising with runner structures connected by cross braces, an elongated member looped in its center connected with said cross bars and runner structures to form side bars and with the loop disposed forwardly, a cross bar mounted between said side bars at the base of the loop, a steering runner pivotally connected at one end at the forward side of said loop to be intermediate and extend parallel with the runner structures, a pair of handle bars movably mounted in the middle portion of said cross bar, an arm extending from said handle bars to swing the movable end of the steering runner, and a spring to resiliently hold the steering runner parallel with the runner structures.

4. A hand sled including with runner structures, a tubular member looped in its middle portion connected on said runner structures to form side bars and with the loop disposed forwardly, brake means mounted at the rear of the sled structure thus formed to have swinging movement, a steering runner pivoted on said loop, and operating handles mounted on a common center at the forward end of said sled structure by which the steering runner and brake means are independently actuated.

5. A hand sled including with runner structures connected by cross braces, an elongated member looped in its center connected with said crossbars and runner structures to form side bars and with the loop disposed forwardly, a crossbar mounted between said side bars at the base of the loop, a steering runner pivotally connected at the forward side of said loop, a pair of handle-bars given swinging mounting at the center of said crossbar and connected to actuate said steering runner, brake means pivotally mounted at the rear of the sled structure, and a brake operating handle mounted on a common pivot with said handle-bars connected to independently actuate said brake means.

6. A hand sled including with runner structures connected by cross braces, an elongated member looped in its center connected with said crossbars and runner structures to form side bars and with the loop disposed forwardly, a crossbar mounted between said side bars at the base of the loop, a steering runner pivotally connected at the forward side of said loop, a pair of handle-bars given swinging mounting at the center of said crossbar and connected to actuate said steering runner, brake means pivotally mounted at the rear of the sled structure, a brake operating handle mounted on a common pivot with said handle-bars connected to actuate said brake means, means to normally hold said steering runner in a central and neutral position, and a spring normally moving said brake mechanism from an operative position, said brake operating handle having a depending lug thereon and the looped portion of the side bar forming member being notched to receive said lug to lock said brake means in a braking position.

In testimony whereof, I affix my signature.

GEORGE W. LOVETT.